United States Patent

Shiiki et al.

[11] Patent Number: 5,083,226
[45] Date of Patent: Jan. 21, 1992

[54] MAGNETIC DISK DRIVE

[75] Inventors: Kazuo Shiiki, Kanagawa; Yoshihiro Shiroishi, Hachioji; Norio Ohta, Iruma; Toshiaki Tsuyoshi, Kawasaki; Hisashi Takano; Fumio Kugiya, both of Hachioji, all of Japan

[73] Assignee: Hitachi, Ltd., Tokyo, Japan

[21] Appl. No.: 410,495

[22] Filed: Sep. 21, 1989

[30] Foreign Application Priority Data

Sep. 22, 1988 [JP] Japan .................. 63-236405

[51] Int. Cl.$^5$ ............................................. G11B 5/596
[52] U.S. Cl. .................................................. 360/77.05
[58] Field of Search ............... 360/77.05, 77.11, 78.04, 360/78.14, 77.01, 77.03

[56] References Cited

U.S. PATENT DOCUMENTS 3,258,750  6/1966  Shew .................. 360/77.01
4,183,059  1/1980  Palmer .............. 360/78.04 X

FOREIGN PATENT DOCUMENTS 61-24021  2/1986  Japan .
62-51022  3/1987  Japan ................. 360/77.03
2096384  10/1982  United Kingdom ........... 360/77.03

OTHER PUBLICATIONS

IBM/TDB vol. 16, No. 4, Sep. 1973, p. 1082 "Optical Servo Information on Magnetic Recording Disks" by Schneider.
IBM/TDB vol. 18, No. 7, Dec. 1975, pp. 2248-2249 "Track Crossing Responsive Device" by Paska.
"Recording Characteristics of Submicron Discrete Magnetic Tracks", (Paper HB-10, Digests of the Intermag Conference, 1987).

*Primary Examiner*—John H. Wolff
*Attorney, Agent, or Firm*—Fay, Sharpe, Beall, Fagan, Minnich & McKee

[57] ABSTRACT

A magnetic-disk drive includes: a magnetic disk having a ridge pattern consisting of at least one ridge extending in the circumferential direction; a recording/reproduction head arranged over the surface of the magnetic disk and having a track width larger than the width of the ridge of the pattern and smaller than the pattern pitch; a device for rotating the magnetic disk; and a recording/reproduction circuit.

19 Claims, 3 Drawing Sheets

ID="1" />
MAGNETIC DISK DRIVE

BACKGROUND OF THE INVENTION

This invention relates to a high-density magnetic drive, and in particular to a highly-reliable magnetic-disk drive having a high track density.

Recently, the capacity of a magnetic-disk drive has increased remarkably; roughly speaking, it has been doubling every three years. This increase in capacity has been attained by improving both the bit density and the track density. However, in order to improve the bit density, it is necessary to narrow the spacing between the head and the medium. In the existing devices, the spacing has been reduced to as small as about 0.2 μm. Thus, it is rather difficult to reduce it by another 0.1 μm or more without deteriorating the slide-withstanding property of the device. In other words, any attempt to further improve the bit density will result in an excessive deterioration in reliability of the device. In view of this, the present invention aims to substantially enlarge the track density of a magnetic-disk drive, thereby making it possible to augment the capacity of the device to a large extent without sacrificing its reliability.

Reducing the track width of a magnetic disk for the purpose of improving its track density will cause the signal to-noise ratio (S/N) thereof to deteriorate. This is particularly true when the head-positioning accuracy is rather poor and reproduction is performed off the track on which the signals to be reproduced are recorded. This not only results in a reduction of signal level corresponding to the deviation from the right track, but allows various background noise attributable to the disordered state of magnetization in those disk areas where no information is recorded to be picked up, which causes a great reduction in the SN ratio, a serious problem in the case where the track width is relatively small. A track width of 5 μm or so may allow a disk device to be realized by some conventional method. However, where the track width is smaller than that, it is necessary to develop a method of improving the SN ratio as much as possible.

A conventional principle in reducing the background noise of a magnetic-disk is described in "Recording Characteristics of Submicron Discrete Magnetic Tracks" (Paper HB-10, Digests of the Intermag Conference, 1987) by S. E. Lambert, I. L. Sanders, A. M. Patlach, and M. T. Krounbi.

Japanese Patent Laid-Open No. 61-24021 discloses a magnetic disk which is capable of performing high-density magnetic recording by virtue of a recess pattern provided between the tracks.

SUMMARY OF THE INVENTION

However, what is considered in the above-mentioned prior art techniques is only the recording medium itself; the construction of a magnetic-disk drive is not taken into account there. In particular, no consideration is to be found therein with regard to a tracking means suited to a medium having a pattern.

It is accordingly an object of this invention to provide a highly reliable magnetic-disk drive which has a high track density and which helps to realize a high SN ratio.

In accordance with this invention, there is provided a magnetic-disk drive comprising: a magnetic disk having a ridge pattern consisting of at least one ridge extending in the circumferential direction of the disk; a recording/reproduction head arranged over the surface of the above-mentioned disk at a space therefrom and having a track width larger than the width of the above-mentioned ridge and smaller than the pitch of the above-mentioned pattern; a means for rotating the above-mentioned magnetic disk; and a recording/reproduction circuit for driving the above-mentioned recording/reproduction head and reproducing signals therefrom.

In a preferable form of this invention, any deviation of the head from the track is made smaller than the difference between the track width of the recording/reproduction head and the width of the ridge.

In this preferable form of this invention, there is further provided a servo head having a track width which is smaller than the ridge width and a tracking circuit adapted to perform tracking control on the basis of signals from the above-mentioned servo head.

In another preferable form of this invention, a plurality of recording/reproduction heads are provided which can be simultaneously accessed on a plurality of magnetic-disk ridge patterns, the operating pitch of each recording/reproduction head being an integral number of times larger than the pitch of the recording-/reproduction pattern.

In the above preferable form of this invention, a plurality of magnetic disks are arranged at intervals in the surface direction, and are rotated in synchronization with each other.

The magnetic disk used in this invention employs a substrate on which a ridge pattern is previously formed with a ridge width corresponding to the track width. A thin recording layer is formed on this substrate. By a usual film-forming method such as sputtering, a magnetic recording layer having steps extending substantially along the configuration of the ridge pattern can be obtained.

The geometrical track width of the head for recording and reproduction is smaller than the pattern pitch and larger than the ridge width. Such a head is also effective for a magnetic disk on which the recording layer proposed by S. E. Lambert et al. mentioned above is patterned.

Generated on a recording layer formed on a patterned substrate are steps extending along the pattern configuration. Accordingly, when performing recording and reproduction on this disk, signals are intensively recorded or reproduced on or from the pattern since the spacing between the head and the recording layer is small there; in the step (groove) areas, which are off the ridges, extra signals due to positional deviation are not likely to be recorded because of the large spacing, nor is the background noise likely to be picked up.

Even when a positional deviation corresponding to the spacing between the ridges of the disk substrate occurs, the same quantity of signals can be written on the same track, and the same quantity of signals can be reproduced from the same track, so that no deterioration in the signal-to-noise ratio occurs because of the positional deviation. Accordingly, the effective track width with respect to the same track density can be made wider.

The magnetic disk used in this invention may be such that the magnetic properties between adjacent tracks are different from those of the track sections and, preferably, the medium sections between the tracks have practically no ability for recording. Such a magnetic disk can be produced by, for example, ion implantation.

The magnetic-disk drive of this invention employs a magnetic disk of the above-described type and the constructions of the recording/reproduction head, the magnetic disk and the tracking means are such that no deterioration in the SN ratio occurs even when the head position is slightly deviated.

In accordance with the construction of this invention, the track width of the recording/reproduction head is made larger than the ridge width of the magnetic disk, so that a constant quantity of signals can be recorded and reproduced if the head position is slightly deviated from the track. At the same time, since the track width of the head is smaller than the pattern pitch, cross strokes from the adjacent tracks can be prevented. Moreover, the amount of positional deviation of the head from the track is adjusted to be smaller than the difference between the track width of the recording/reproduction head and the ridge width, thereby preventing the signal to-noise ratio from fluctuating.

In addition, the magnetic-disk drive may employ a multitrack-type head, which makes it possible to control track deviation efficiently.

BRIEF DESCRIPTION OF THE PREFERRED EMBODIMENTS

[Embodiment 1]

Figure 1A:
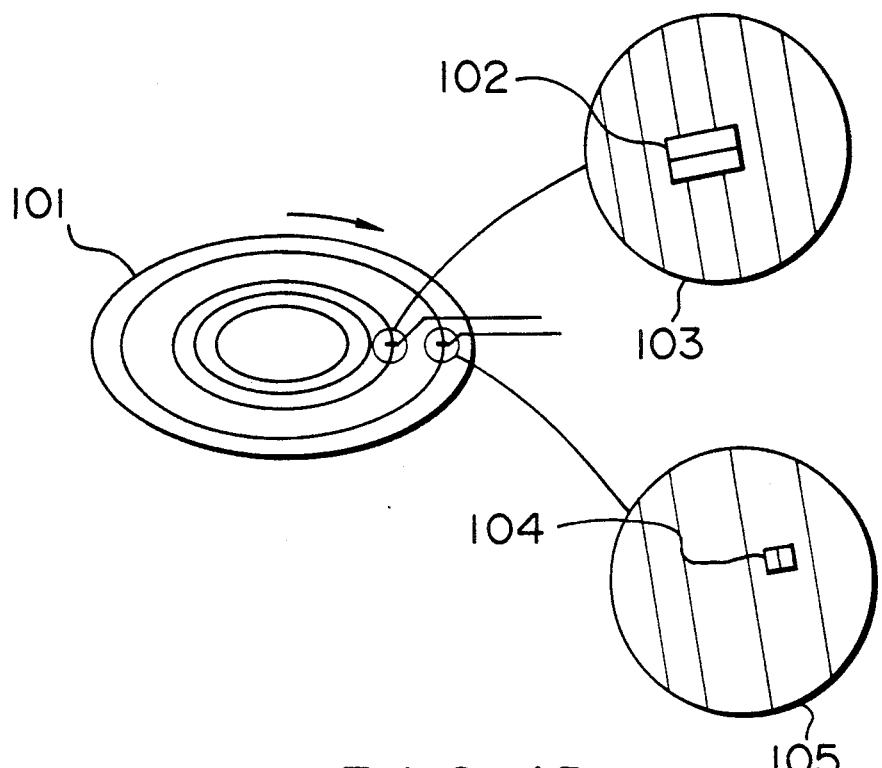
FIG. 1A is a conceptual drawing illustrating the relationship between the track and head of the recording medium of this invention.
Figure 1B:
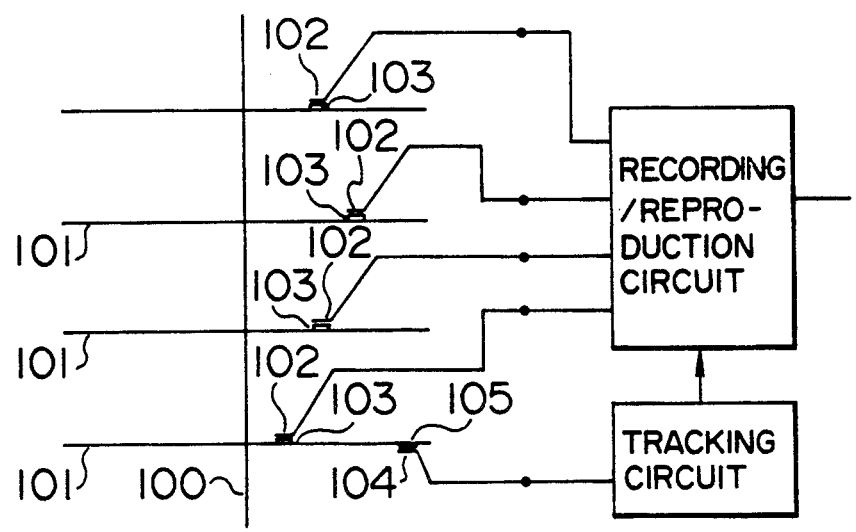
FIG. 1B is a diagram showing the construction of the magnetic-disk drive of this invention.

FIG. 1 is a diagram showing the construction of the magnetic disk drive of this invention. FIG. 1B schematically shows the overall structure of the unit. A plurality of disks 101 are attached to a cylinder 100. As shown in detail in FIG. 1A, each disk comprises a recording/reproduction pattern 103 and a servo pattern 105 for tracking. In this embodiment, the servo pattern is provided on the outermost peripheral section on one side of a disk, the rest consisting of recording/reproduction patterns.

As shown in the drawing, the width of the recording/reproduction head, which includes separate recording and reproduction head elements is slightly larger than the disk-pattern ridge width, whereas the width of the servo head is slightly smaller than that. The width of the recording/reproduction-pattern ridge is about 0.5 $\mu m$ or less, and the distance between the disk and the head is 0.1 $\mu m$ or more. The servo head has a dual-element structure, i.e., it includes two head elements. These two head elements are arranged in the track width direction, with output being obtained from each of them. Signals are recorded over the entire area of this servo pattern. Any deviation of the servo head from the pattern is detected from the resulting decrease 15 in element output on the deviation side.

Tracking is performed by moving the recording/reproduction head in accordance with these servo signals. This is what is called a servo-surface-servo-type operation. For the reason explained below, it is desirable, in the disk drive of this invention, that the track-deviation amount be smaller than the difference between the track width of the head and the pattern-ridge width of the disk. As for the servo, the positional-deviation amount can be controlled by thus employing a dual-element structure. If data-surface servo control is effected by providing a servo pattern on each recording/reproduction surface, the tracking accuracy will be improved. However, this will make the tracking system more complicated.

In the case where the track width is relatively small, which this invention is intended for, it is difficult to effect positioning with satisfactory reproducibility on a track previously formed on the disk. A multitrack-type head will allow the difficulty in positioning to be mitigated. For example, it is more advantageous to use one of the plurality of head elements of the multitrack for the purpose of detecting the tracking data and to simultaneously access the entire multitrack head on a plurality of patterns formed on the magnetic disk, than to access plural data tracks individually. To realize such a method, the pitch of each head element of the multitrack-type head should be approximately an integral number of times larger than the pattern pitch of the magnetic layer formed on the magnetic disk, the head track corresponding to the disk pattern without fail. Tracking information should be previously written to the pattern formed on the magnetic disk.

The following tracking method may be suited to the magnetic disk system of this invention: the track width of the tracking-head element is made different from that of the other head elements for recording and reproduction, or the pattern-ridge width of the magnetic disk to which the corresponding tracking information is written is made different accordingly, and the track-width of the head is made slightly smaller than the pattern-ridge width of the magnetic disk, thereby allowing the pattern edge of the magnetic disk to be detected.

At least one or more such tracking patterns must be provided for a cylinder to which a plurality of disks are attached; to effect more correct tracking, one or more of such tracking patterns must be provided on each disk surface. When, in the case of a multitrack head, one of the tracks is used for tracking, a more correct tracking can be effected by using the pattern-ridge with a spacing corresponding to the track number as the tracking pattern. The tracking patter is preferably positioned in the outermost peripheral section of the disk in view of the slide-withstanding property.

Generally, to substantially augment the drive capacity, it is necessary to increase the data transfer speed accordingly. However, the transfer speed cannot be increased solely by improving the track density while keeping the bit density constant. The transfer speed might be increased by increasing the revolving speed of the disk. This, however, is not desirable in view of the slide-withstanding property. However, the transfer speed can be improved by adopting at the same time a multitrack system which can simultaneously access a plurality of tracks. Thus, through the application of this invention, the transfer speed and the drive capacity can be augmented at the same time while avoiding the problem of the slide-withstanding property.

Figure 5:
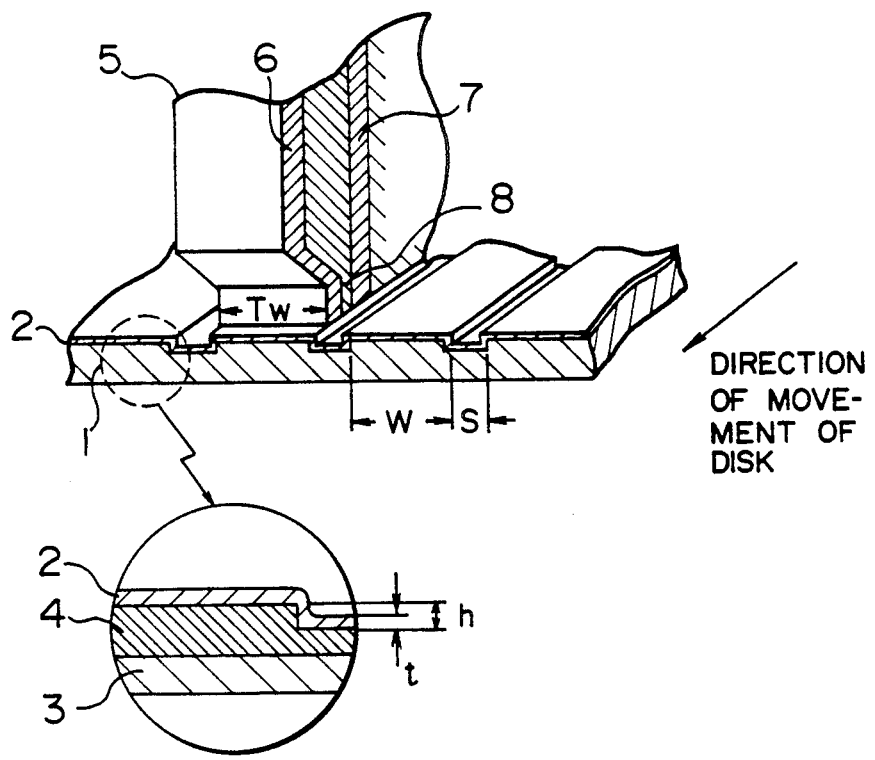
FIG. 5 is a sectional view showing the relationship between the head and recording medium in this invention.

The relationship between the magnetic disk and the recording/reproduction head used in this invention will now be described with reference to FIG. 5. The disk used comprises a patterned substrate 1 which is covered with a CoNi recording medium 2. The substrate consists of a glass plate 3 and a photoresist pattern (organic polymer) 4 formed thereon. The substrate has a diameter of 130 mm and a thickness of 2 mm. The pattern dimensions are as follows: ridge width w: 1.6 $\mu$m; ridge height h: 0.08 $\mu$m; distance s between ridges 0.5 $\mu$m. The pattern has a concentric configuration. The pattern pitch p (=w+s) is 2.1 $\mu$m. Such a substrate can be prepared by a method similar to that used in manufacturing optical discs. That is, a photoresist layer is provided on the glass substrate by spin coating, a pattern being formed thereon by means of a laser beam. For industrial purposes, a substrate patterned by means of a laser beam may be used as the original, from which replicas are obtained, thus making it possible to manufacture a large quantity of substrates at low cost.

The method uses a glass plate permeable to light and adopts an organic polymer which can be polymerized by being irradiated with light, which allows pattern transfer to be easily effected. Thus, this method is advantageous from the industrial point of view.

The CoNi-recording-medium layer was provided on the substrate by sputtering. In view of the fact that forming the layer directly on the photoresist can present an excellent magnetizing property from being obtained, a crystal-orientation control layer of Cr was provided in this embodiment. Generally, it is desirable that a layer like this be provided. The thickness t of the CoNi recording medium was 500 Å, and its coercive force was 980 Oe.

The magnetic head 5 used is a thin-film head whose geometrical track width Tw is 1.8 $\mu$m. This track width Tw is larger than the pattern-ridge width (1.6 $\mu$m) of the magnetic disk of this embodiment, and smaller than the pattern pitch (2.1 $\mu$m) thereof. The material for its magnetic poles is a permalloy having a saturation magnetic density of 9.5 kG, and the magnetic poles 6 and 7 of the upper and lower sections have a thickness of 1.2 $\mu$m and 0.8 $\mu$m, respectively. The length of its optical gap 8 is 0.2 $\mu$m. With the generally adopted working technique, the magnetic-pole pattern is subject to tapering. Taking effectiveness into account, the track width Tw in this case may be the length of that side of the upper magnetic pole facing the lower magnetic pole. The head of this embodiment can be prepared by photolithography as used in the manufacture of semiconductors.

The head is allowed to float over the medium at a relative speed of 12 m/s and with the maximum proximity of 0.15 $\mu$m with respect to the medium.

The signal-to-noise ratio in this system with a bit density of 30 kFCI was examined First, recording was conducted on a certain track. Then, the changes in the reproduction output and in the noise were obtained while moving the magnetic head in the track-width direction. In moving the magnetic head, piezoelectric elements were utilized. The amount of movement was measured by means of a laser measuring machine The reproduction output and the noise were measured by means of a spectrum analyzer, and the measurement range for the noise was up to double the recording frequency corresponding to the bit density. The evaluation of the noise was conducted on the so-called medium noise, neglecting the head noise as well as that generated by the circuit system.

Figure 2:
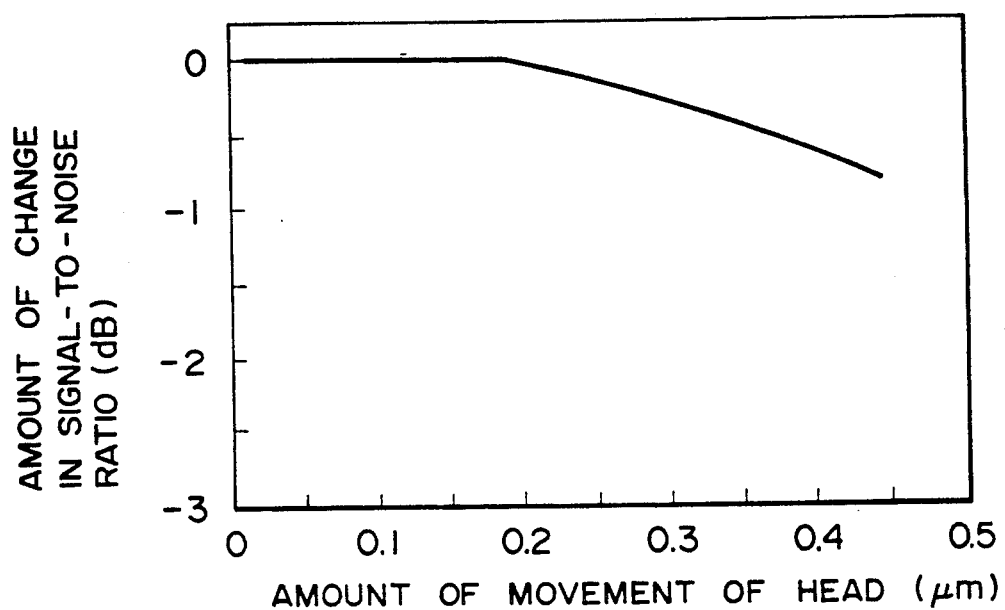
FIG. 2 is a graph showing the relationship between the moving amount of the head and the changing amount of the signal-to-noise ratio in accordance with this invention.
Figure 3:
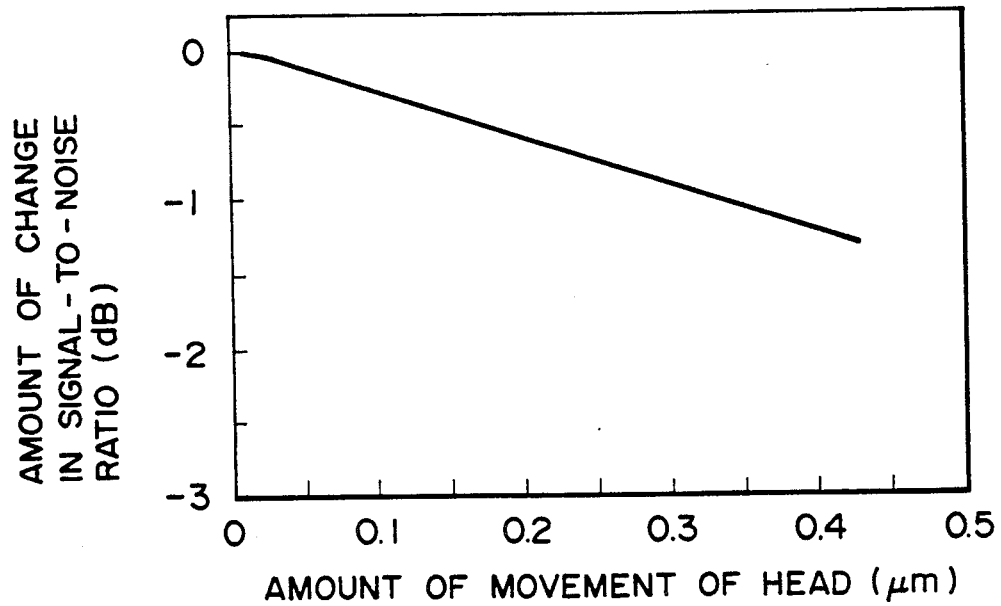
FIG. 3 is a graph showing the relationship between the moving amount of the head and the changing amount of the signal-to-noise ratio in a conventional recording medium.

The measurement result is indicated by the solid line of FIG. 2. In the drawing, the abscissa represents the head moving amount, and the ordinate represents the change in the signal-to-noise ratio (S/N), in relative values. As will be appreciated from this drawing, any positional deviation of the head by up to 0.2 $\mu$m, which corresponds to 10% or so of the pattern-ridge width, results in no deterioration in the signal-to-noise ratio. Thus, any normally-foreseen positional deviation of the head while the unit is operating results in no significant SN ratio deterioration, a feature which characterizes this invention. For comparison, the result obtained by using a conventional medium is shown in FIG. 3. As will be appreciated from the drawing, a slight positional deviation of the head results in the signal-to-noise ratio greatly deteriorating.

Figure 4:
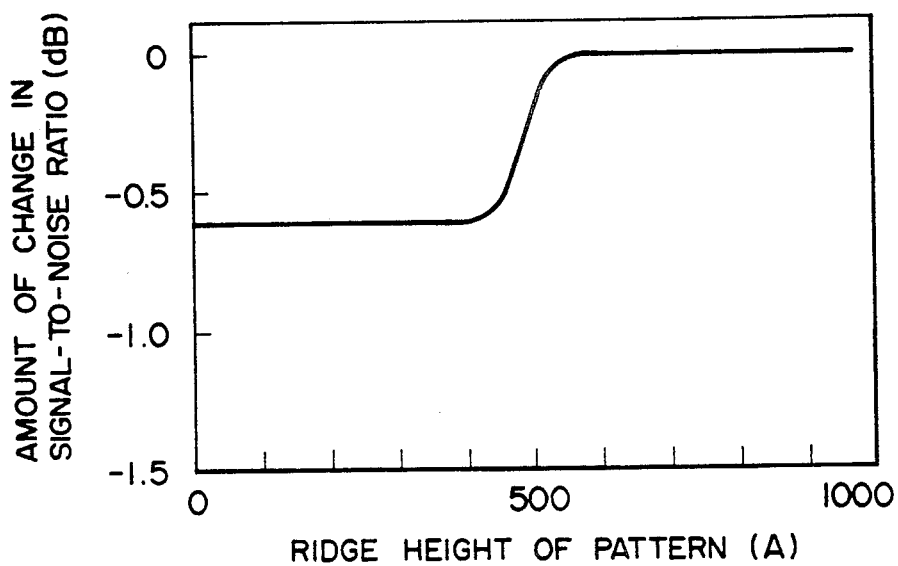
FIG. 4 is a graph showing the relationship between the ridge height and the changes in signal-to-noise ratio in the recording medium of this invention.

FIG. 4 shows the result of a similar experiment conducted with the height of the pattern formed on the magnetic-disk substrate being varied. In the drawing, the abscissa represents the height h of the pattern, and the ordinate represents the signal-to-noise ratio when a positional deviation of 0.2 $\mu$m occurs. It will be appreciated from this result that the present invention proves particularly effective when the pattern height h is 500 Å or more.

Whether the pattern provided on the substrate should have a spiral configuration or a concentric configuration depends on the signal recording format and the substrate processing method. Whichever of the two may be adopted, it makes no difference to the effect of this invention.

It is an important problem also in this invention how to position the head accurately. It is desirable that the positioning range be smaller than the difference between the head track width and the disk-pattern-ridge width so that any influence of adjacent pattern sections may be avoided. In this embodiment, it is desirable that the positioning be effected within a range of 0.2 $\mu$m (this corresponds to 10% of the track width) or less.

[Embodiment 2]

A disk drive was composed employing the same medium system as that of Embodiment 1, and using a magnetoresistive-type (MR) detector for the reproduction head element. Since the magnetoresistive effect does not depend on the medium speed, a magnetoresistive-type head element is more advantageous than a usual induction-type head element in the case where the relative speed between the head and medium is relatively low. The slide-withstanding property depends on the relative speed, and, generally speaking, the lower the relative speed, the better the slide-withstanding property becomes, so that the magnetoresistive-type head may be regarded as more advantageous in respect of reliability. However, when combined with a conventional medium, the magneto-resistive-type head element is likely to involve an intensive off-track noise. By employing, as in the present invention, a patterned medium, the off-track noise when the reproduction head element is deviated from the track becomes remarkably low, whereby high recording density is attained and high reliability is ensured.

What is claimed is:

1. A magnetic-disk drive comprising: a magnetic disk having a ridge pattern consisting of a plurality of ridges extending in a circumferential direction, at least two adjacent ridges being separated by a distance S, at least one ridge having a width W; a recording/reproduction head arranged over a surface of said disk and having a track with Tw larger than the width W of said ridge and smaller than a pitch of said pattern, said pitch being defined as W+S; wherein said at least one ridge has a height of at least 500 Å, and wherein a distance between said recording/reproduction head and said magnetic disk is 0.1 μm or more.

2. A magnetic-disk drive as claimed in claim 1, wherein said recording/reproduction head has a recording head element and a reproduction head element which are arranged side by side in a direction in which said at least one ridge extends, and wherein the track width of both head elements is larger than the width W of said at least one ridge and smaller than the pitch W+S of said pattern.

3. A magnetic-disk drive as claimed in claim 2, wherein said reproduction head element is a magnetoresistive-type head element.

4. A magnetic-disk drive as claimed in claim 1, further comprising servo means for preventing a deviation of said recording/reproduction head from said at least one ridge by an amount that is smaller than a difference between the track width Tw of said recording/reproduction head and the width W of said ridge.

5. A magnetic-disk drive as claimed in claim 4, wherein said deviation amount is 10% or less of the track with Tw of said recording/reproduction head.

6. A magnetic-disk drive as claimed in claim 4, wherein the track width Tw of said recording/reproduction head is 5 μm or less, and wherein said deviation amount is 0.2 μm or less.

7. A magnetic-disk drive as claimed in claim 4, further comprising a servo had having a track width Tw which is smaller than the width W of said at least one ridge of said pattern, and a tracking circuit for performing tracking control in accordance with signals from said servo head.

8. A magnetic-disk drive as claimed in claim 7, wherein said magnetic disk comprises a recording/reproduction pattern on and from which said recording/reproduction head records and reproduces information, and a servo pattern on which servo signals are recorded, said recording/reproduction pattern and said servo pattern having different ridge widths.

9. A magnetic-disk drive as claimed in claim 8, wherein said servo pattern is provided in an outermost peripheral section of the magnetic disk.

10. A magnetic-disk drive as claimed in claim 7, wherein all of said ridges have the same width, and wherein the track width Tw of said recording/reproduction head is different from that of said servo head.

11. A magnetic-disk drive as claimed in claim 7, wherein said pattern has a concentric configuration.

12. A magnetic-disk drive as claimed in claim 7, wherein said pattern has a spiral configuration.

13. A magnetic-disk drive as claimed in claim 7, wherein said servo head has a dual-element structure in which two head elements are arranged in parallel in a width direction of said ridge.

14. A magnetic-disk drive as claimed in claim 7, wherein a plurality of said recording/reproduction heads are provided, which are accessed simultaneously on a plurality of ridge patterns of said magnetic disk, an operating pitch of each recording/reproduction head being an integral number of times larger than the pitch W+S of the recording/reproduction pattern.

15. A magnetic-disk drive as claimed in claim 14, wherein a plurality of said magnetic disks are arranged at intervals in a surface direction and are rotated in synchronization with each other.

16. A magnetic-disk drive as claimed in claim 15, wherein at least one recording/reproduction head is operatively arranged with respect to each of said recording/reproduction disks.

17. A magnetic-disk drive, comprising:
a magnetic disk having a ridge pattern having a plurality of ridges, at least two adjacent ridges being separated by a distance S, at least one ridge being formed on said disk to extend in a circumferential direction, said at least one ridge having a width W;
a recording/reproduction head arranged over a surface of said disk, said recording/reproduction head having a track width Tw larger than the width W of said at least one ridge and smaller than a pitch W+S of said pattern, said recording/reproduction head being set above said at least one ridge of said pattern for recording/reproduction; and
means for preventing said recording/reproduction head from deviating from a position above said at least one ridge of said pattern by a deviation amount that is smaller than a difference between the track width Tw of said recording/reproduction head and the width W of said at least one ridge.

18. A magnetic-disk drive as claimed in claim 17, wherein the deviation amount of position of said recording/reproduction head is 10% or less of the track width Tw.

19. A magnetic-disk drive as claimed in claim 17, wherein the deviation amount of position of said recording/reproduction head is 0.2 μm or less.

* * * * *